US012140981B2

(12) United States Patent
Chang et al.

(10) Patent No.: US 12,140,981 B2
(45) Date of Patent: Nov. 12, 2024

(54) SENSING AND CONTROLLING MODULE OF AIRFLOW, AIRFLOW SENSING ASSEMBLY, AND AIRFLOW CONTROLLING ASSEMBLY

(71) Applicants: Yun-Shan Chang, San Jose, CA (US); Da-Wei Lin, Taichung (TW)

(72) Inventors: Yun-Shan Chang, San Jose, CA (US); Da-Wei Lin, Taichung (TW)

( * ) Notice: Subject to any disclaimer, the term of this patent is extended or adjusted under 35 U.S.C. 154(b) by 9 days.

(21) Appl. No.: 18/120,831

(22) Filed: Mar. 13, 2023

(65) Prior Publication Data

US 2024/0302849 A1 Sep. 12, 2024

(30) Foreign Application Priority Data

Mar. 10, 2023 (TW) ................................ 112108940

(51) Int. Cl.
*G05D 7/06* (2006.01)
*G01F 1/58* (2006.01)

(52) U.S. Cl.
CPC ........... *G05D 7/0635* (2013.01); *G01F 1/582* (2013.01); *G05D 7/0694* (2013.01)

(58) Field of Classification Search
CPC .. G05D 7/0635; G05D 7/0694; G05D 7/0106; G01F 1/582; G01F 1/38; G01F 1/383; G01F 3/20; G01F 3/225; G01F 3/226; G01F 3/227; G01F 15/16; F16K 7/00
USPC .................................... 137/98, 99, 99.5, 100
See application file for complete search history.

(56) References Cited

U.S. PATENT DOCUMENTS

| | | | | |
|---|---|---|---|---|
| 3,841,158 | A * | 10/1974 | Hunter | G01L 19/0645 73/729.1 |
| 3,967,504 | A * | 7/1976 | Akeley | G01L 9/007 73/861.47 |
| 4,788,867 | A * | 12/1988 | Kishel | G01L 9/0085 73/706 |
| 2020/0371536 | A1* | 11/2020 | Tanaka | F04B 17/003 |
| 2021/0366652 | A1* | 11/2021 | O'Connell | H01F 27/2804 |

FOREIGN PATENT DOCUMENTS

| | | | |
|---|---|---|---|
| CN | 108139242 | A | 6/2018 |
| CN | 110462359 | A | 11/2019 |
| EP | 0845603 | A1 | 6/1998 |
| TW | 201819864 | A | 6/2018 |

* cited by examiner

*Primary Examiner* — Kelsey E Cary
(74) *Attorney, Agent, or Firm* — Snell & Wilmer L.L.P.

(57) ABSTRACT

A sensing and controlling module of airflow for an active aerosol suction device has a tube, a sensing membrane, a sensing coil, a controlling membrane, a controlling coil, and a magnetic unit. The sensing membrane is mounted in the tube. The controlling membrane is disposed at an air inlet of the tube. The sensing membrane and the controlling membrane are capable of bending deformation. The sensing coil is adhered to and spread on the surface of the sensing membrane, and the controlling coil is adhered to and spread on the surface of the controlling membrane. The magnetic unit is disposed at a spaced interval from the sensing membrane and the controlling membrane. With the sensing membrane and the controlling membrane, the sensing and controlling module is capable of sensing and controlling airflow rate.

10 Claims, 5 Drawing Sheets

SENSING AND CONTROLLING MODULE OF AIRFLOW, AIRFLOW SENSING ASSEMBLY, AND AIRFLOW CONTROLLING ASSEMBLY

CROSS-REFERENCE TO RELATED APPLICATIONS

This application claims priority to Taiwanese Patent Application Serial No. 112108940 filed Mar. 10, 2023, the disclosure of which is hereby incorporated by reference in its entirety.

BACKGROUND OF THE INVENTION

1. Field of the Invention

The present invention relates to a sensing and controlling module, especially to a sensing and controlling module for sensing and controlling the airflow rate.

2. Description of the Prior Art

The conventional airflow rate sensing and controlling modules usually need a large space to install, and therefore, the conventional airflow rate sensing and controlling modules are hard to be mounted in small devices. Besides, the piezoelectric units for detecting the pressure would be strongly affected under a high temperature condition, resulting in outputting inaccurate data or failure. Therefore, the piezoelectric units are not suitable for a device that deals with high temperature gas.

On the other side, spring valves and movable valves are usually used as the controlling units to adjust airflow rate conventionally. However, the spring valve has the risk of elastic fatigue. The movable valve needs a broad space to install due to the assisting unit, so it is difficult to install a movable valve in a micro channel, and it is hard to repair once the movable valve breaks down.

In an aerosol suction device, the airflow sensing function and the airflow controlling function are both needed. However, the mechanisms of the piezoelectric unit, the spring valve, and the movable valve are all different, the structures of the aforementioned units are complicated, and therefore, these units are difficult to be installed in an aerosol suction device which is small.

To overcome the shortcomings, the present invention provides a sensing and controlling module to mitigate or obviate the aforementioned problems.

SUMMARY OF THE INVENTION

The main objective of the present invention is to provide a sensing and controlling module of airflow that can be installed in an active aerosol suction device which would deal with gas at high temperature.

The sensing and controlling module of airflow has a tube, a sensing membrane, a sensing coil, a controlling membrane, a controlling coil, and a magnetic unit. The tube includes an airflow channel formed within the tube, and the airflow channel contains a balancing section and a sensing section. A balancing opening is disposed at the tube, and communicates with the balancing section of the airflow channel and the environment. A communicating opening communicates with the sensing section of the airflow channel. An air inlet is formed at the tube, and the air inlet is disposed at one end of the airflow channel.

The sensing membrane is disposed between the balancing section and the sensing section of the airflow channel. The sensing membrane includes a rim and a surface, and the surface is surrounded by the rim. The rim is connected to an inner wall of the airflow channel, and thereby the airflow channel is sealed by the sensing membrane. The sensing membrane is capable of bending and deforming along an extending direction of the airflow channel.

The sensing coil is adhered to and spread on the surface of the sensing membrane.

The controlling membrane is disposed at the air inlet, and the controlling membrane is capable of bending and deforming along the extending direction of the airflow channel. The controlling membrane includes a surface.

The controlling coil is adhered to and spread on the surface of the controlling membrane.

The magnetic unit is disposed at a spaced interval from the sensing membrane, and the magnetic unit is disposed at a spaced interval from the controlling membrane.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
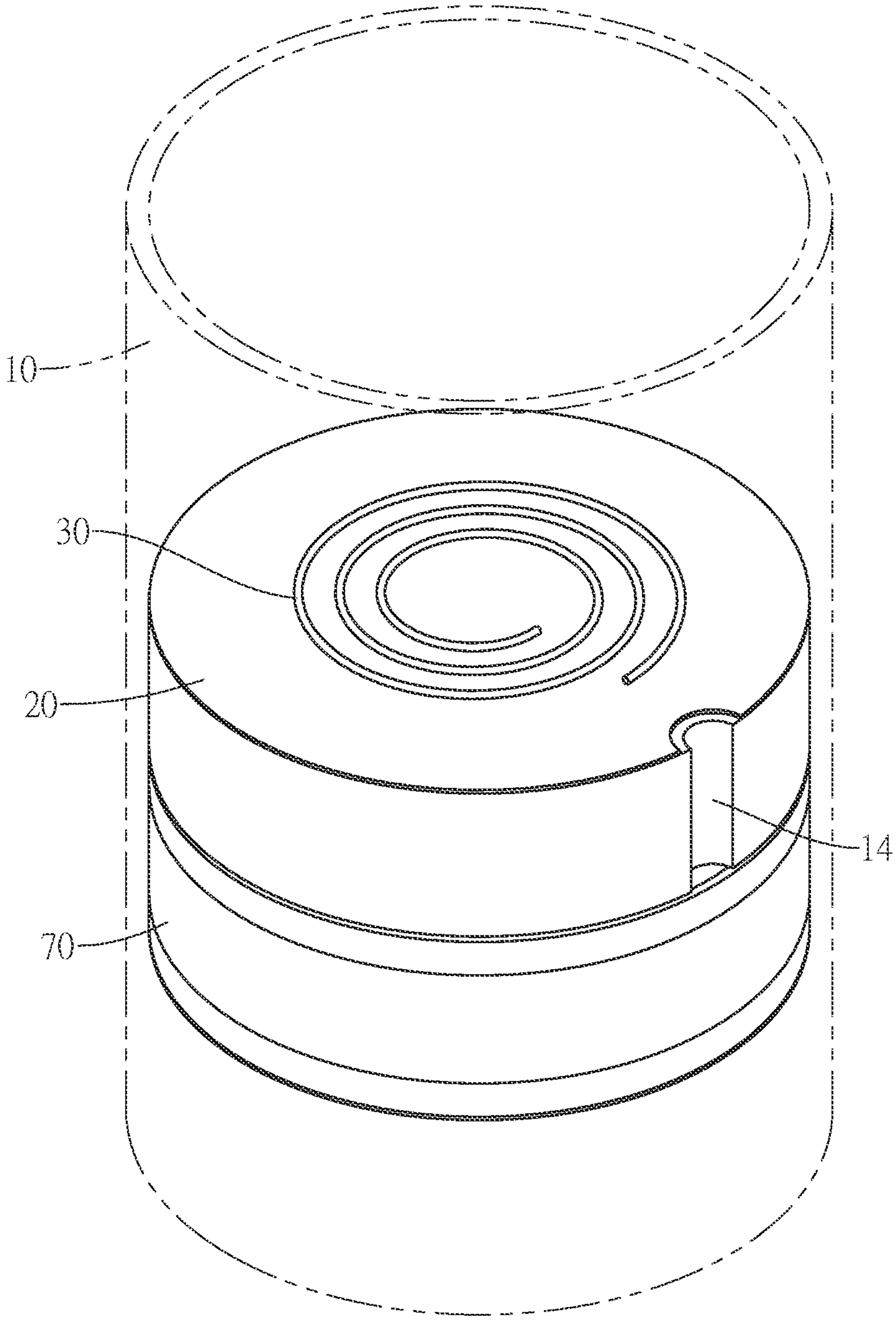
FIG. 1 is a partial perspective view of a sensing and controlling module of airflow in accordance with the present invention.
Figure 2:
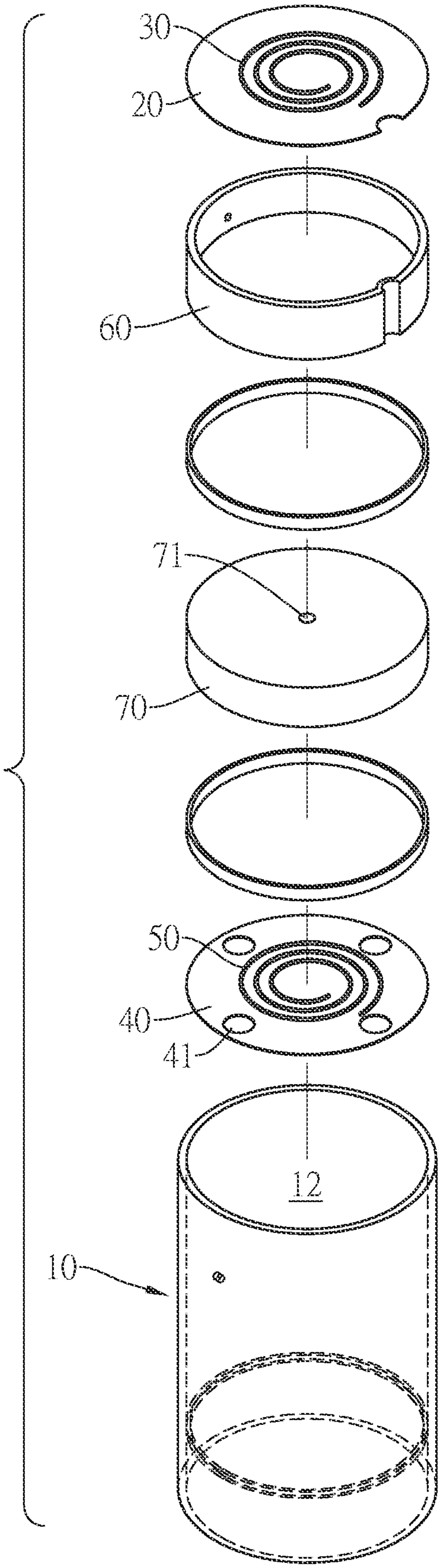
FIG. 2 is an exploded perspective view of the sensing and controlling module of airflow in FIG. 1.
Figure 3:
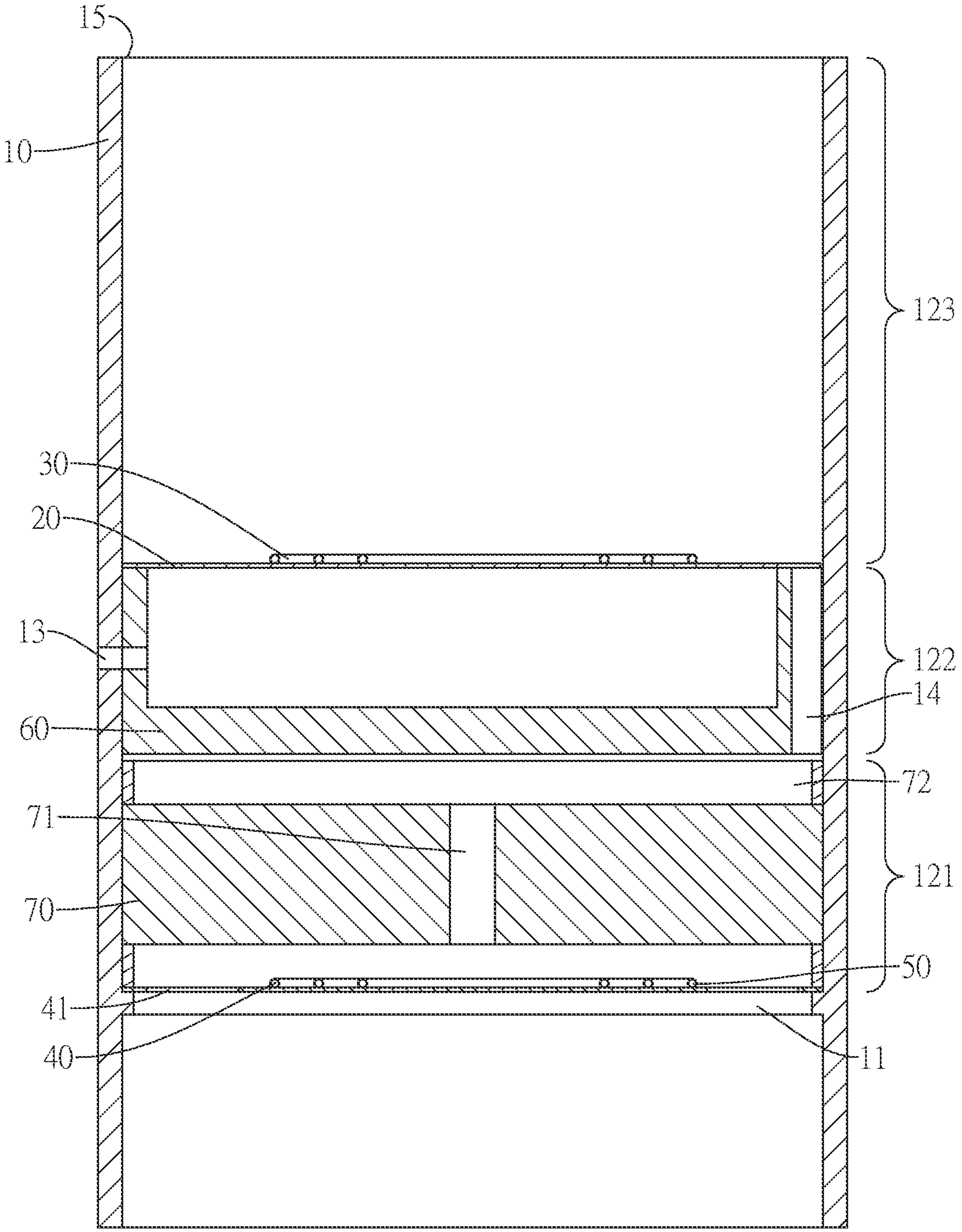
FIG. 3 is a side cross section view of the sensing and controlling module of airflow in FIG. 1.
Figure 4:
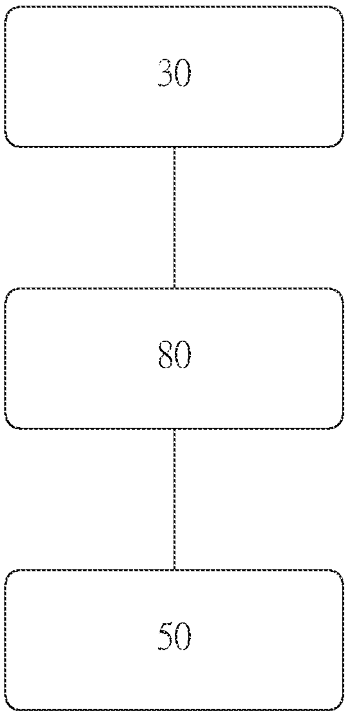
FIG. 4 is a flow chart of a controlling unit connecting method with the sensing coil and the controlling coil in accordance with the present invention.

With the reference to FIGS. 1 to 4, a sensing and controlling module of airflow in accordance with the present invention includes a tube 10, a sensing membrane 20, a sensing coil 30, a controlling membrane 40, a controlling coil 50, a separating unit 60, a magnetic unit 70, and a controlling unit 80.

The tube 10 includes an air inlet 11, an airflow channel 12, a balancing opening 13, a first channel 14, and a communicating opening 15. The air inlet 11 is formed in the tube 10, and the air inlet 11 is disposed at one end of the airflow channel 12. The airflow channel 12 is formed in the tube 10, and the airflow channel 12 includes an entering section 121, a balancing section 122, and a sensing section 123.

In addition, we can define that the airflow channel 12 in the tube 10, the balancing opening 13, the communicating opening 15, the sensing membrane 20, the sensing coil 30, and the magnetic unit 70 together as an airflow sensing assembly: likewise, we can define the airflow channel 12 in the tube 10, the controlling membrane 40, the controlling coil 50, and the magnetic unit 70 as an airflow controlling assembly.

The entering section 121 is disposed between the air inlet 11 and the balancing section 122, and the sensing section 123 is connected to the balancing section 122. The balancing opening 13 is formed in the tube 10, and the balancing opening 13 communicates with the balancing section 122 of the airflow channel 12 and the outside environment. The first channel 14 is formed in the tube 10, and the first channel 14 communicates with the entering section 121 and the sensing section 123. The communicating opening 15 communicates with the sensing section 123.

The sensing membrane 20 is disposed between the balancing section 122 and the sensing section 123 of the airflow channel 12. The sensing membrane 20 is capable of bending and deforming along the extending direction of the airflow channel 12. The sensing membrane 20 includes a rim and a surface, and the rim surrounds the surface. The rim of the sensing membrane 20 is connected to the inner wall of the airflow channel 12, and thereby the airflow channel 12 is sealed by the sensing membrane 20. The sensing coil 30 is adhered to and spread on the surface of the sensing membrane 20.

The controlling membrane 40 is disposed at the air inlet 11 of the airflow channel 12. The controlling membrane 40 is capable of bending and deforming along the extending direction of the airflow channel 12. The controlling membrane 40 includes a surface. The controlling coil 50 is adhered to and spread on the surface of the controlling membrane 40. In this embodiment, the controlling membrane 40 further includes a rim, and the rim of the controlling membrane 40 surrounds the surface of the controlling membrane 40. The rim of the controlling membrane 40 is connected to the inner wall of the air inlet 11, and thereby the air inlet 11 is sealed by the controlling membrane 40. The controlling membrane 40 further includes a perforation hole 41. The perforation hole 41 is formed at the controlling membrane 40, and the perforation hole 41 communicates with the airflow channel 12. In another embodiment, the air inlet 11 is not sealed by the controlling membrane 40, and the controlling membrane 40 does not have the perforation hole 41.

The separating unit 60 is disposed in the airflow channel 12, and the separating unit 60 is located between the entering section 121 and the balancing section 122. The separating unit 60 is connected to the inner wall of the tube 10, and thereby the tube 10 is sealed by the separating unit 60. In another embodiment, the sensing and controlling module of airflow does not have to include the separating unit 60. To be more precise, the sensing membrane 20 blocks the communicating state of the balancing section 122 and the sensing section 123, and the separating unit 60 blocks the communicating state of the entering section 121 and the sensing section 123; therefore, the balancing section 122 only communicates with the outside environment through the balancing opening 13. Besides, the airflow from the entering section 121 to the sensing section 123 passes via the first channel 14.

The magnetic unit 70 is mounted in the entering section 121. In another embodiment, the magnetic unit 70 is mounted between the entering section 121 and the balancing section 122 of the airflow channel 12. To be more precise, the entering section 121 further includes an air outlet disposed at the end which communicates with the balancing section 122 of the entering section 121. The magnetic unit 70 is mounted at the air outlet, the rim of the magnetic unit 70 is connected to the inner wall of the air outlet, and thereby the magnetic unit 70 seals the air outlet. The magnetic unit 70 may further include a second channel 71 formed within the magnetic unit 70, and the second channel 71 communicates with the entering section 121 and the first channel 14. Furthermore, in another embodiment, the magnetic unit 70 can be disposed to another site such as the sensing section 123, or outside the airflow channel 12. Moreover, the sensing and controlling module of airflow may have more magnetic units 70.

The magnetic unit 70 is disposed at a spaced interval from the sensing membrane 20, and the magnetic unit 70 is also disposed at a spaced interval from the controlling membrane 40. In this embodiment, the magnetic unit 70 is disposed in the entering section 121, and the magnetic unit 70 blocks the airflow channel 12, therefore, the entering section 121 is divided into two parts. The second channel 71 of the magnetic unit 70 communicates with the two parts of the entering section 121. In another embodiment, the magnetic unit 70 is not required to seal the airflow channel 12 or to have the second channel 71.

The magnetic unit 70 is disposed at a spaced interval from the separating unit 60, and thus a chamber 72 is formed by the inner wall of the airflow channel 12, the separating unit 60, and the magnetic unit 70. The first channel 14 communicates with the chamber 72 and the sensing section 123, and the second channel 71 of the magnetic unit 70 also communicates with the chamber 72. In another embodiment which does not include the separating unit 60, the second channel 71 of the magnetic unit 70 communicates with the first channel 14 directly.

The controlling unit is connected to the sensing coil 30 and the controlling coil 50. The controlling unit 80 is configured to accept the signals from the sensing coil 30 and output signals to the controlling coil 50, and thereby the controlling unit 80 deforms the controlling membrane 40 with the controlling coil 50 in the magnetic field of the magnetic unit 70.

Figure 5:
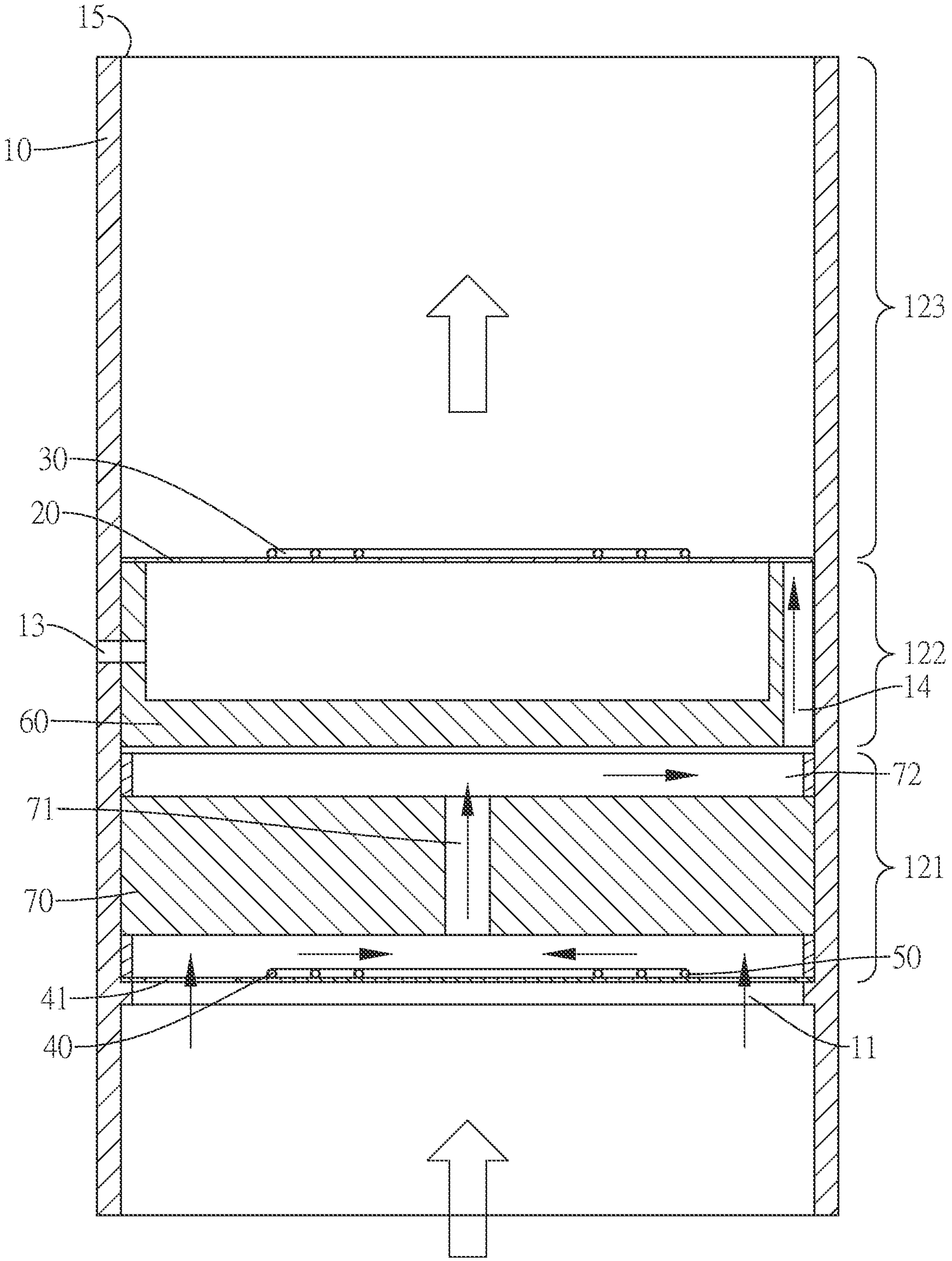
FIG. 5 is a side cross section view indicating the airflow pathways of the sensing and controlling module of airflow in FIG. 1.

FIG. 5 indicates the airflow pathway in this disclosure. The airflow would enter the air inlet 11, then the airflow would pass through the controlling membrane 40 via the perforation hole 41, and finally the airflow would enter the second channel 71 of the magnetic unit 70. The volume of the space between the controlling membrane 40 and the magnetic unit 70 would change with the deformation of the controlling membrane 40 to control the airflow.

To be more precise, the controlling unit 80 is capable of adjusting the current in the controlling coil 50 to generate the magnetic field changes, and then the controlling coil 50 would attract or repel the magnetic unit 70 and further deform the controlling membrane 40. Therefore, the space between the controlling membrane 40 and the magnetic unit 70 would be enlarged or reduced to control the airflow that would enter the second channel 71.

Next, the airflow would enter the chamber 72, and then the airflow would enter the sensing section 123 through the first channel 14; finally, the airflow would flow out from the airflow channel 12.

The pressure in the balancing section 122 keeps in balance with the pressure of the outside environment via the balancing opening 13. The pressure in the sensing section 123 would change due to the airflow passing through. The sensing membrane 20 would deform whenever the pressure difference between the balancing section 122 and sensing section 123 changes, thus the sensing coil 30 would deform with the sensing membrane 20. Signals would be generated since the deformation of the sensing coil 30, and then be outputted to the controlling unit 80.

Besides, each of the airflow sensing assembly and the airflow controlling assembly in this disclosure can work independently. To be more precise, in this embodiment, the airflow sensing assembly and the airflow controlling assembly are mounted in an airflow channel 12 and share the same one magnetic unit 70. Therefore the volume of the whole device decreases, and the airflow sensing assembly and the airflow controlling assembly are capable of working simultaneously. In another embodiment, each of the airflow sensing assembly and the airflow controlling assembly has a magnetic unit 70 and an independent airflow channel itself, and thereby each of the airflow sensing assembly and the airflow controlling assembly can work independently.

In summary, with the airflow sensing assembly, the sensing and controlling module of airflow is capable of detecting the pressure difference between the sensing section 123 and the balancing section 122 in the airflow channel 12 with the sensing membrane 20, and further getting the flow rate of the airflow in the sensing section 123. With the airflow controlling assembly, the sensing and controlling module of airflow in this disclosure is also capable of adjusting the flow rate of the airflow which would enter the airflow channel 12. The sensing and controlling module of airflow adjusts the flow rate via controlling the controlling membrane 40 deformation at the air inlet 11 and thereby changing the volume of the space between the controlling membrane 40 and the magnetic unit 70 change.

With the magnetic field of the magnetic unit 70, the sensing coil 30 adhered to and spread on the surface of the sensing membrane 20 and the controlling coil 50 adhered to and spread on the surface of the controlling membrane 40 together provide a simple method to sense and control the flow rate of airflow.

Besides, unlike the piezoelectric units, the airflow sensing assembly in this disclosure would not be affected by the high temperature, and the airflow sensing assembly is capable of providing precise data under high temperature. The structure of the airflow controlling assembly is simpler than the spring valve and the movable valve, and thereby the airflow controlling assembly is easier to install.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sensing and controlling module of airflow comprising:

a tube including:

an airflow channel formed within the tube, the airflow channel containing a balancing section and a sensing section;

a balancing opening disposed at the tube and communicating with the balancing section of the airflow channel and the environment;

a communicating opening communicating with the sensing section of the airflow channel; and an air inlet formed at the tube, and the air inlet disposed at one end of the airflow channel;

a sensing membrane disposed between the balancing section and the sensing section of the airflow channel; wherein the sensing membrane comprises a rim and a surface, the surface surrounded by the rim; the rim is connected to an inner wall of the airflow channel, and thereby the airflow channel is sealed by the sensing membrane; the sensing membrane is capable of bending and deforming along an extending direction of the airflow channel;

a sensing coil adhered to and spread on the surface of the sensing membrane;

a controlling membrane disposed at the air inlet, the controlling membrane being capable of bending and deforming along the extending direction of the airflow channel; the controlling membrane comprising a surface;

a controlling coil adhered to and spread on the surface of the controlling membrane;

a magnetic unit disposed at a spaced interval from the sensing membrane, and the magnetic unit disposed at a spaced interval from the controlling membrane.

2. The sensing and controlling module of airflow as claimed in claim 1, wherein:

the airflow channel further comprises an entering section, the entering section is disposed between the air inlet and the balancing section; and the sensing and controlling module of airflow further comprises:

a separating unit mounted in the airflow channel, and the separating unit disposed between the entering section and the balancing section, the separating unit connected to the inner wall of the airflow channel, and thereby the airflow channel sealed by the separating unit; and a first channel formed within the tube and communicating with the entering section and the sensing section.

3. The sensing and controlling module of airflow as claimed in claim 2, wherein the magnetic unit is mounted in the airflow channel and disposed between the balancing section and the entering section; the magnetic unit is connected to the inner wall of the airflow channel, and thereby the airflow channel is sealed by the magnetic unit; the magnetic unit further comprises:

a second channel formed at the magnetic unit, the second channel communicating with the entering section and the first channel.

4. The sensing and controlling module of airflow as claimed in claim 3, wherein the sensing and controlling module of airflow further comprises:

a controlling unit connected to the sensing coil and the controlling coil.

5. The sensing and controlling module of airflow as claimed in claim 2, wherein the magnetic unit is mounted in the entering section and disposed at a spaced interval from the separating unit; the magnetic unit is connected to the inner wall of the airflow channel, and thereby the airflow channel is sealed by the magnetic unit; the sensing and controlling module of airflow further comprises:

a chamber formed among the inner wall of the airflow channel, the magnetic unit, and the separating unit; the first channel communicating with the chamber and the sensing section; and the magnetic unit further comprises:

a second channel formed at the magnetic unit, the second channel communicating with the chamber and the air inlet.

6. The sensing and controlling module of airflow as claimed in claim 5, wherein the sensing and controlling module of airflow further comprises:

a controlling unit connected to the sensing coil and the controlling coil.

7. The sensing and controlling module of airflow as claimed in claim 1, wherein the sensing and controlling module of airflow further comprises:

a controlling unit connected to the sensing coil and the controlling coil.

8. An airflow sensing assembly comprising:

an airflow channel including a balancing section and a sensing section;

a balancing opening communicating with the balancing section of the airflow channel and the environment outside the airflow sensing assembly;

a communicating opening communicating with the sensing section of the airflow channel;

a sensing membrane disposed between the balancing section and the sensing section of the airflow channel, the sensing membrane being capable of bending and deforming along an extending direction of the airflow channel; the sensing membrane comprising:

a rim and a surface, the surface surrounded by the rim; the rim connected to an inner wall of the airflow channel, and thereby the airflow channel sealed by the sensing membrane;

a sensing coil adhered to and spread on the surface of the sensing membrane; and a magnetic unit disposed at a spaced interval from the sensing membrane.

9. An airflow controlling assembly comprising:

an airflow channel including an air inlet, the air inlet disposed at one end of the airflow channel;

a controlling membrane mounted at the air inlet, the controlling membrane being capable of bending and deforming along an extending direction of the airflow channel; the controlling membrane comprising a surface;

a controlling coil adhered to and spread on the surface of the controlling membrane; and a magnetic unit disposed at a spaced interval from the controlling membrane;

wherein the controlling membrane further comprises:

a rim surrounding the surface, and the rim connected to an inner wall of the air inlet, and thereby the air inlet sealed by the controlling membrane; and at least one perforation hole formed on the controlling membrane, and the at least one perforation hole communicating with the airflow channel.

10. The airflow controlling assembly as claimed in claim 9, wherein the airflow channel further comprises:

an air outlet disposed at another end of the airflow channel, and the magnetic unit mounted at the air outlet.

* * * * *